(12) United States Patent
Shin

(10) Patent No.: US 12,565,029 B2
(45) Date of Patent: Mar. 3, 2026

(54) FUNCTIONAL FABRIC OBTAINED BY RECYCLING SEPARATOR FOR SECONDARY BATTERY, AND METHOD FOR MANUFACTURING SAME

(71) Applicant: RightRoute Co. Ltd., Seoul (KR)

(72) Inventor: Min Jeong Shin, Seoul (KR)

(73) Assignee: RightRoute Co. Ltd., Seoul (KR)

( * ) Notice: Subject to any disclaimer, the term of this patent is extended or adjusted under 35 U.S.C. 154(b) by 367 days.

(21) Appl. No.: 18/025,658

(22) PCT Filed: Jul. 9, 2021

(86) PCT No.: PCT/KR2021/008804
§ 371 (c)(1),
(2) Date: Mar. 10, 2023

(87) PCT Pub. No.: WO2022/065646
PCT Pub. Date: Mar. 31, 2022

(65) Prior Publication Data
US 2023/0339221 A1      Oct. 26, 2023

(30) Foreign Application Priority Data

Sep. 22, 2020      (KR) ........................ 10-2020-0122044
May 24, 2021      (KR) ........................ 10-2021-0066138

(51) Int. Cl.
B32B 27/12      (2006.01)
B32B 5/02      (2006.01)
(Continued)

(52) U.S. Cl.
CPC ................ B32B 27/12 (2013.01); B32B 5/02 (2013.01); B32B 7/12 (2013.01); B32B 27/306 (2013.01);
(Continued)

(58) Field of Classification Search
None
See application file for complete search history.

(56) References Cited

U.S. PATENT DOCUMENTS 4,908,251 A      3/1990  Iimura et al.

FOREIGN PATENT DOCUMENTS

JP              11-099601        4/1999
KR      10-1988-0003743        5/1988
(Continued)

OTHER PUBLICATIONS

KR 20150040114A machine translation (Year: 2015).*
(Continued)

*Primary Examiner* — Barbara J Musser

(57)      ABSTRACT

The present invention relates to a functional fabric manufacturing method and a functional fabric thereby, which relates to a method for manufacturing an upcycle functional fabric, comprising steps of: (a) preparing a separator sheet with a microporous structure discarded due to treatment as defective or overproduction in production processes for manufacturing secondary batteries, (b) interposing an adhesive sheet between the separator sheet and a fabric sheet to be added to the separator sheet, thereby supplying each sheet, (c) laminating the separator sheet and the fabric sheet so that they are bonded by melting of the adhesive sheet, wherein in the step (b), each sheet is supplied to maintain a constant tension, but the separator sheet, the adhesive sheet, and the fabric sheet are all supplied at the same speed, and in the step (c), a stacked structure, in which the separator sheet, the adhesive sheet, and the fabric sheet are stacked in this order, is pressurized in a predetermined temperature atmosphere, and laminated.

1 Claim, 4 Drawing Sheets

(51) Int. Cl.

| | |
|---|---|
| *B32B 7/12* | (2006.01) |
| *B32B 27/30* | (2006.01) |
| *B32B 27/32* | (2006.01) |
| *B32B 37/12* | (2006.01) |
| *B32B 37/20* | (2006.01) |
| *B32B 38/00* | (2006.01) |
| *B32B 38/18* | (2006.01) |
| *D06C 11/00* | (2006.01) |
| *H01M 10/54* | (2006.01) |

(52) U.S. Cl.

CPC .......... *B32B 27/32* (2013.01); *B32B 37/1207* (2013.01); *B32B 37/203* (2013.01); *B32B 38/0012* (2013.01); *B32B 38/1808* (2013.01); *D06C 11/00* (2013.01); *H01M 10/54* (2013.01); *B32B 2037/1223* (2013.01); *B32B 2262/08* (2013.01); *B32B 2305/026* (2013.01); *B32B 2305/18* (2013.01); *B32B 2307/724* (2013.01); *B32B 2307/7242* (2013.01); *B32B 2307/7265* (2013.01); *B32B 2309/12* (2013.01); *B32B 2309/14* (2013.01); *B32B 2317/10* (2013.01); *B32B 2323/00* (2013.01); *B32B 2331/04* (2013.01); *B32B 2437/00* (2013.01); *D10B 2501/00* (2013.01)

(56) References Cited

FOREIGN PATENT DOCUMENTS

| | | | | |
|---|---|---|---|---|
| KR | 10-2004-0101646 | 12/2004 | | |
| KR | 10-2016-0078313 | 7/2016 | | |
| KR | 20160078313 A | * | 7/2016 | ........... D06M 17/06 |
| KR | 10-2020-0001419 | 1/2020 | | |

OTHER PUBLICATIONS

International Search Report and the Written Opinion Dated Oct. 18, 2021 From the International Searching Authority Re. Application No. PCT/KR2021/008804 and Its Translation of Search Report Into English. (10 Pages).

* cited by examiner (a)                 (b)

Supply roll

Compression roller

Supply roll

Compression roller 10
20
30

Secondary battery → Surplus separator → Re-USE → Manufacturing functional fabric → Clothing production

FUNCTIONAL FABRIC OBTAINED BY RECYCLING SEPARATOR FOR SECONDARY BATTERY, AND METHOD FOR MANUFACTURING SAME

RELATED APPLICATIONS

This application is a National Phase of PCT Patent Application No. PCT/KR2021/008804 having International filing date of Jul. 9, 2021, which claims the benefit of priority of Korean Patent Applications Nos. 10-2021-0066138 filed on May 24, 2021, and 10-2020-0122044 filed on Sep. 22, 2020. The contents of the above applications are all incorporated by reference as if fully set forth herein in their entirety.

FIELD AND BACKGROUND OF THE INVENTION

The present disclosure relates to a functional fabric obtained by recycling a separator for secondary batteries and a method for manufacturing the same, which relates to, more specifically, to a functional fabric manufactured by recycling waste separators in production processes for manufacturing secondary batteries without undergoing any chemical process, and a method for manufacturing the same.

Recently, as the number of people enjoying various leisure activities increases, interests of functional fabrics increase, whereby there is a trend that the fields in which functional fabrics are used are diversified and the scale gradually increases.

Among these functional fabrics, moisture-permeable and waterproof fabrics with a moisture-permeable and water-proof function that passes water in the form of vapor and does not pass water in liquid state are not only used for clothing such as mountaineering wear, skiwear, and outdoor clothes, but also their application scope expands to outdoor products such as sleeping bags and tents.

As the clothing using moisture-permeable and waterproof fabrics prevents water in the form of droplets, such as rainwater, from penetrating into the clothing, and discharges sweat in the form of water vapor generated by physical activity to the outside, it can provide users with comfort and excellent wearing sensations, so that the moisture-permeable and waterproof function is emphasized as a more important function.

Gore-Tex, which is well known as a material for functional fabrics with moisture-permeable and waterproof functions, and a polytetrafluoroethylene (PTFE) film coated with hydrophilic non-porous polyurethane currently lead the functional material market, but are expensive materials imported from overseas, whereby the development of materials that can replace them is continuously attempted.

Meanwhile, in the lithium secondary battery (hereinafter, referred to as a 'secondary battery'), the demand thereof rapidly increases as a power source based on its high energy density, discharge voltage, and output stability for various e-mobility as well as mobile electronic devices, where the secondary battery is composed of a positive electrode material, a negative electrode material, an electrolyte, and a separator separating the positive electrode material and the negative electrode material.

Here, the separator is a thin membrane in the form of a film or sheet made of an insulating material, which consists of a micro porous structure blocking physical contact between the positive electrode material and the negative electrode material, and including a plurality of fine pores to serve as a passage through which lithium ions can move between two electrodes.

Because the separator with such a structure has a similar structure to that of Gore-Tex, which is a functional material, it can implement a moisture-permeable and waterproof function and can be used as a functional material.

In production processes for manufacturing secondary batteries, separators are treated as defective due to defects such as micro scratches or discarded due to overproduction, and thus there is a situation that the generation amount of the waste-type separators gradually increases along with the explosive growth of secondary batteries.

Nevertheless, separators composed of polyolefin-based polymers are simply treated by an incineration or crushing method without regeneration, thereby causing problems of resource waste and environmental pollution.

Accordingly, the present applicant tried to solve the environmental problem caused by the waste separators and use highly functional material separators as a material for functional fabrics, but found the following problems.

First, in a process of bonding for patching the fabric sheet to the separator, fine pores of the separator may be blocked, and second, the separator and the fabric sheet must be bonded with an adhesive to have a certain peel strength, but when heat is excessively supplied in this process, there is a problem that the separator becomes hard due to thermal curing to the extent that it cannot be used as a functional fabric. FIG. 1 is a photograph that in a process of bonding a separator to a fabric sheet, the separator and the fabric sheet are separated because the peel strength is not secured, and a schematic diagram schematically illustrating the same.

Therefore, the present invention is intended to propose a method for manufacturing a functional fabric having a peel strength and a soft touch sense that can be used as a functional fabric, wherein the functional fabric has a soft touch sense, without damaging the porous structure of the separator composed of fine pores, and a functional fabric thereby.

SUMMARY OF THE INVENTION

It is one aspect of the present invention to provide a method for manufacturing an upcycle fabric which can implement functionality through a microporous type structure by recycling a separator that has been discarded and collected due to overproduction or quality deterioration during processes of manufacturing secondary batteries in an optimal state capable of bonding to a fabric, and an upcycle fabric manufactured thereby.

In addition, it is one aspect of the present invention to provide a method for manufacturing an upcycle fabric capable of solving problems, such as curing problems (texture, tactual sense, touch) and peel strength implementation, that may occur due to heat and pressure in the process of bonding the separator to the fabric through a laminating process, and an upcycle fabric.

A method for manufacturing an upcycle functional fabric according to one example of the present invention comprises steps of (a) preparing a separator sheet with a microporous structure discarded due to treatment as defective or overproduction in production processes for manufacturing secondary batteries, (b) interposing an adhesive sheet between the separator sheet and a fabric sheet to be added to the separator sheet, thereby supplying each sheet, (c) laminating the separator sheet and the fabric sheet so that they are bonded by melting of the adhesive sheet, wherein in the step (b), each sheet is supplied to maintain a constant tension, but the separator sheet, the adhesive sheet, and the fabric sheet are all supplied at the same speed, and in the step (c), a stacked structure, in which the separator sheet, the adhesive sheet, and the fabric sheet are stacked in this order is pressurized in a predetermined temperature atmosphere.

According to one example of the present invention, the adhesive sheet may be a hot melt web adhesive made of an ethylene vinyl acetate (EVA) component and formed in the form of a web provided with a plurality of pores.

According to one example of the present invention, the fabric sheet may have fine hairs of very thin threads formed by a brushing process on one side facing the separator sheet in order to increase an adhesive surface area with the separator sheet.

According to one example of the present invention, in the step (b), the separator sheet, the fabric sheet, and the adhesive sheet may be supplied at a speed of 6 to 10 m/min.

According to one example of the present invention, in the step (c), the adhesive sheet may be melted in a temperature atmosphere composed of 100 to 120° C.

According to one example of the present invention, in the step (c), the stacked structure may pass between compression rollers maintaining a gap and facing each other and simultaneously be pressurized at a pressure of 2 to 7 kgf/cm$^2$ by the compression rollers.

Another example of the present invention comprises an upcycle functional fabric manufactured by the above manufacturing method.

Another example of the present invention may comprise an upcycle functional fabric comprising a separator sheet with a microporous structure discarded due to treatment as defective or overproduction in production processes for manufacturing secondary batteries, an adhesive sheet laminated on one side of the separator sheet layer, and formed by hot melt fibers of an ethylene vinyl acetate (EVA) component in a web form to be provided with a plurality of pores, and a fabric sheet laminated on one side of the adhesive sheet, wherein a stacked structure stacked in the order of the separator sheet, the adhesive sheet, and the fabric sheet passes between compression rollers maintaining a gap and facing each other in a temperature atmosphere set to 100 to 120° C. at a speed of 6 to 10 m/min, but is pressurized at 2 to 7 kgf/cm$^2$ by the compression rollers, and the separator sheet and the fabric sheet are thermally bonded by the adhesive sheet melted in the process.

According to one example of the present invention, the fabric sheet may be made of any one selected from eco-friendly wool, organic cotton, polyester, nylon, conductive yarn products, or aramid.

According to one example of the present invention, a hot melt-type adhesive sheet in a web form is adopted upon bonding a separator sheet and a fabric sheet by a lamination method, whereby it is possible to provide an upcycle fabric capable of implementing functionality of the separator.

According to one example of the present invention, a separator sheet, a fabric sheet, and an adhesive sheet interposed therebetween are supplied at the same speed to each other upon bonding the separator sheet and the fabric sheet by a lamination method, and pressurized at a constant temperature in a predetermined temperature atmosphere, whereby it is possible to provide an upcycle fabric solving the thermal curing phenomenon of the separator and having an excellent peel strength.

DESCRIPTION OF SPECIFIC EMBODIMENTS OF THE INVENTION

Figure 1:
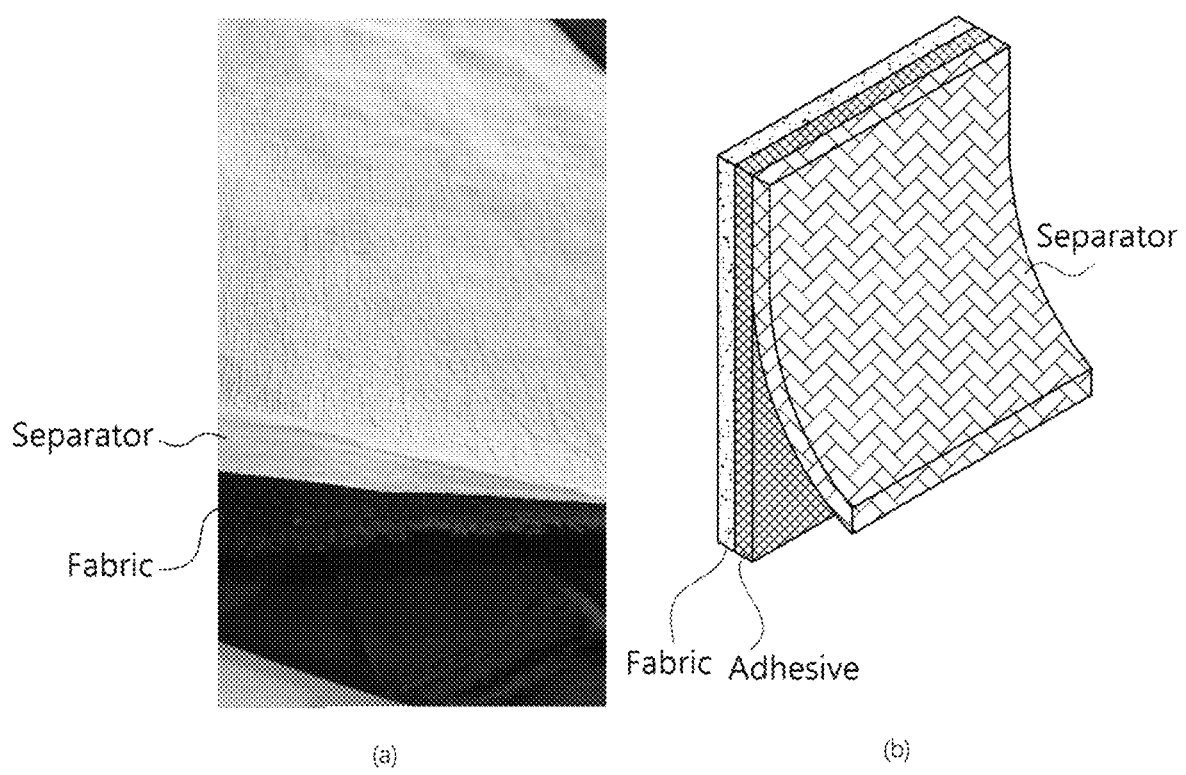
FIG. 1 is a photograph that in a process of bonding a separator to a fabric sheet, the separator and the fabric sheet are separated because the peel strength is not secured, and a schematic diagram schematically illustrating the same.

Hereinafter, with reference to the accompanying drawings, examples of the present invention will be described in detail so that those having ordinary knowledge in the technical field to which the present invention belongs can easily practice. The present invention may be embodied in many different forms, which is not limited to the examples set forth herein. In order to clearly describe the present invention in the drawings, parts irrelevant to the description have been omitted, and the same reference numerals are assigned to the same or similar components throughout the specification.

In addition, throughout the specification, when any part "comprises" any component, it means that it may further comprise other components without excluding other components unless otherwise stated.

Figure 2:
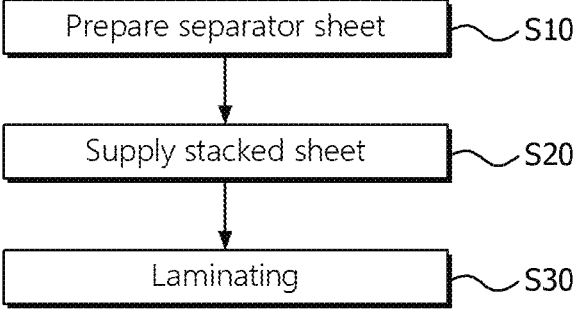
FIG. 2 is a process flow diagram of a method for manufacturing an upcycle functional fabric according to one example of the present invention.
Figure 3:
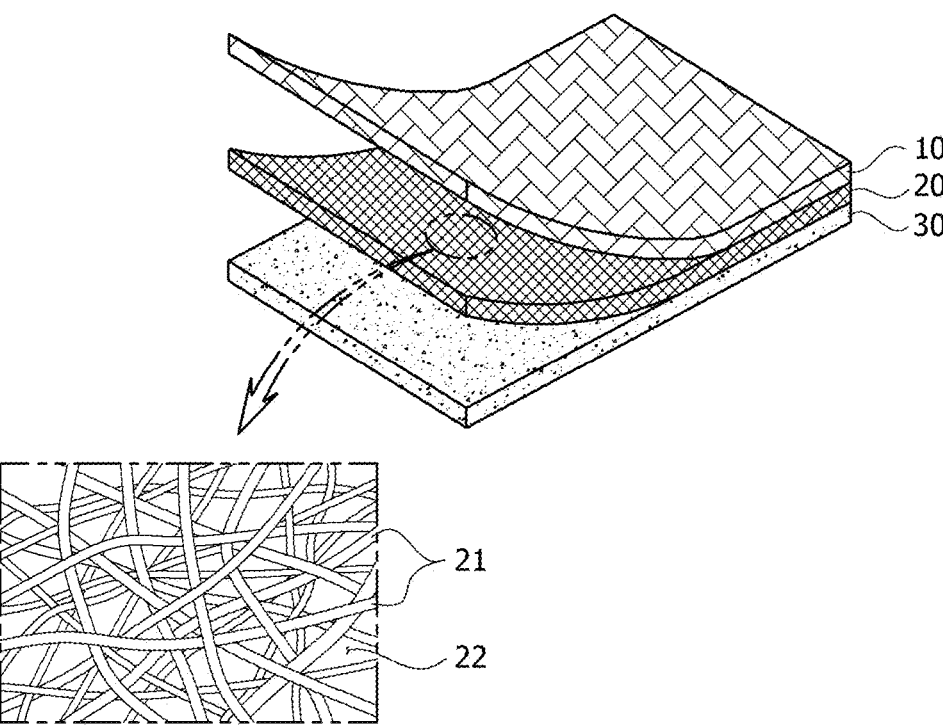
FIG. 3 is a schematic diagram of a stacked structure of a separator sheet, an adhesive sheet, and a fabric sheet for manufacturing an upcycle functional fabric according to one example of the present invention.
Figure 4:
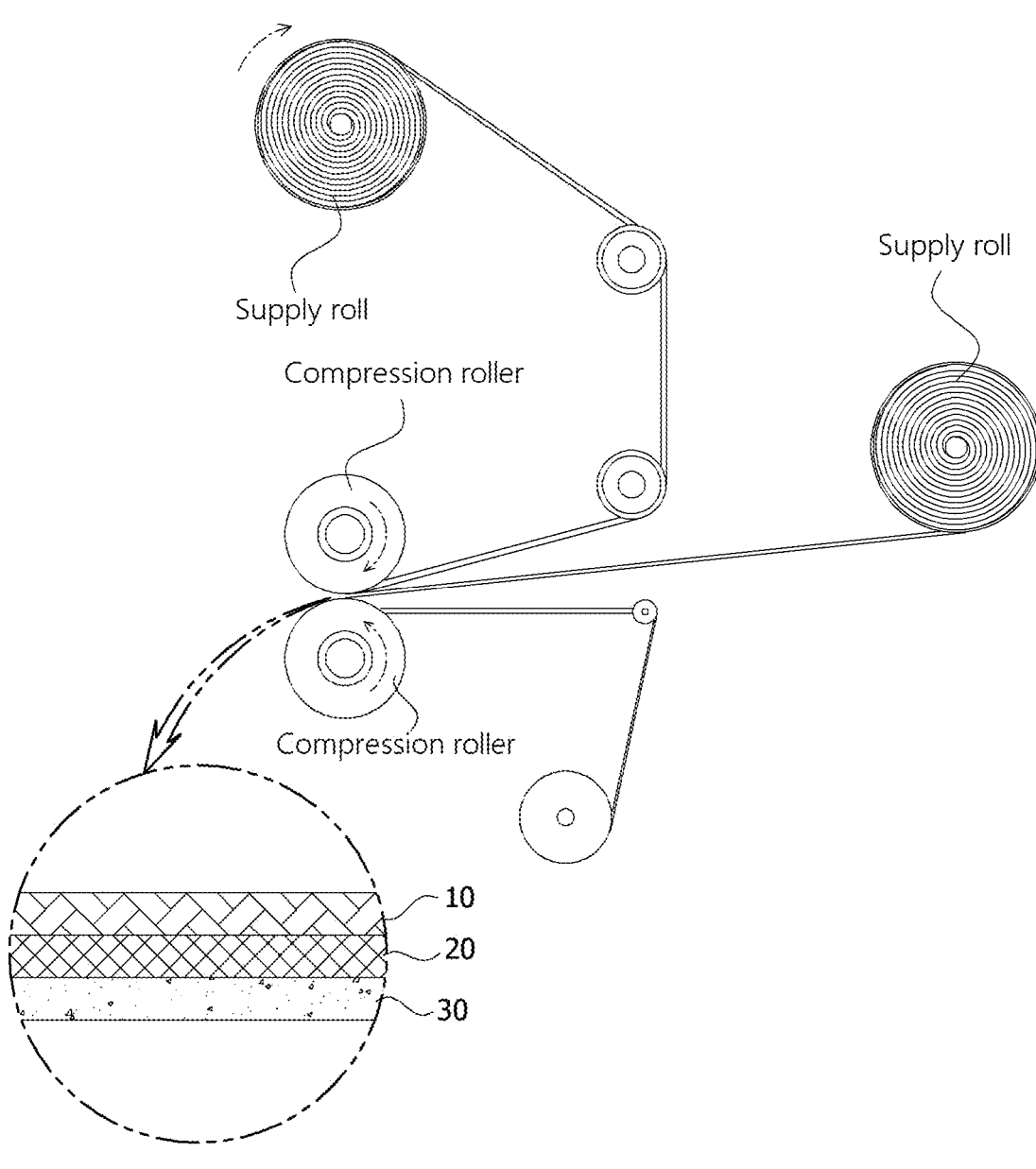
FIG. 4 is a configuration diagram of an apparatus for laminating a separator sheet and a fabric sheet with an adhesive sheet according to one example of the present invention.
Figure 5:
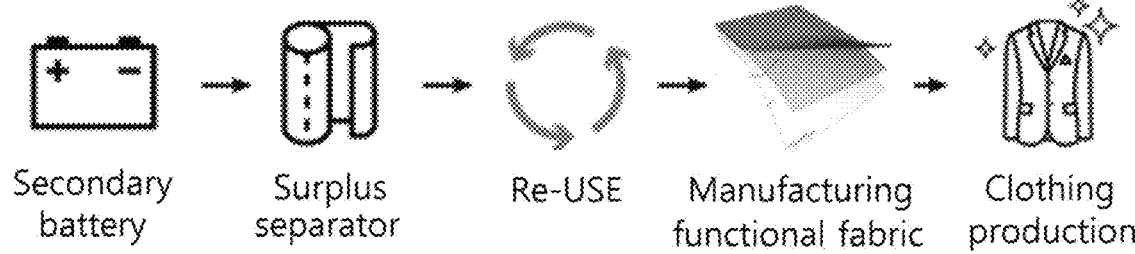
FIG. 5 is a series of flow diagrams in which a functional fabric manufactured according to one example of the present invention is applied as a clothing material.

FIG. 2 is a process flow diagram of a method for manufacturing an upcycle functional fabric according to one example of the present invention, FIG. 3 is a schematic diagram of a stacked structure of a separator sheet, an adhesive sheet, and a fabric sheet for manufacturing an upcycle functional fabric according to one example of the present invention, FIG. 4 is a configuration diagram of an apparatus for laminating a separator sheet and a fabric sheet with an adhesive sheet according to one example of the present invention, and FIG. 5 is a series of flow diagrams in which a functional fabric manufactured according to one example of the present invention is applied as a clothing material.

The term upcycle has a meaning comprising recycling which means that disused articles or wastes are recycled and used, and upgrade which means the addition and improvement of new functions in existing functions.

Therefore, the upcycle used in this specification is included in an upcycle category in that it secures price competitiveness and has eco-friendly advantages by recycling discarded polyolefin polymer films (resources that can be obtained from waste) to produce high-functional fabrics, where the functional fabric produced by the manufacturing method according to the present invention is called an upcycle functional fabric.

The upcycle functional fabric manufacturing method according to one example of the present invention comprises a separator sheet preparation step (S10), a stacked sheet supply step (S20), and a laminating step (S30).
Separator Sheet Preparation Step (S10)

First, in the separator sheet preparation step (S10), a separator sheet (10) having a moisture-permeable and waterproof function may be prepared.

The separator sheet (10) may comprise separators that have been overproduced and discarded in the production process for secondary batteries, or separators with a quality that cannot be used for secondary batteries (treatment as defective due to minor flaws or scratches, and the like, or quality that is poor in marketability).

Here, the separator means a separator made of a microporous structure, the state of which is difficult to realize the function of a secondary battery, but is sufficient to realize moisture-permeable and waterproof functionality, and comprises all cases where the size or arrangement of a plurality of pores formed in the separator is uniform or non-uniform.

The separator sheet (10) is in the form of a thin film, and has made of a microporous structure comprising a plurality of pores, which may be composed of a polyolefin-based polymer film such as polyethylene or polypropylene. The separator sheet (10) does not include a polymer film made of a polyurethane material, or a polyester film.

The plurality of pores constituting the microporous structure of the separator sheet (10) may have a diameter of 0.1 to 1 μm, and implement a moisture-permeable and waterproof function through such pores.

Since the pores of the separator sheet (10) have a diameter smaller than that of water droplets (100 to 3,000 μm) and larger than that of water vapor (about 0.0004 μm), the water vapor can be passed while the water droplets are not passed.

For example, when clothes are made of functional fabrics using separators, outside water molecules cannot be penetrated inside the body, and the sweat generated from the body can be discharged to the outside in the form of water vapor. Here, the movement of water vapor in only one direction (outward direction) is because of the pressure difference between the inside and the outside of the functional fabric, generated while the sweat is vaporized by heat, and the functional fabric in which such a moisture-permeable and waterproof function is implemented can provide users with comfort and excellent wearing sensations.

In this specification, the separator sheet (10) is separators composed of a polyolefin-based polymer that are expected to be discarded after being overproduced, which means separators without performing separate chemical processes for securing carbon dioxide reduction, recycling cost reduction and eco-friendliness, and it should be noted that it is different from a polyolefin-based moisture-permeable film obtained by comprising a filler in a polyolefin film and stretching the film in at least one axis to make it porous.

Also, in this specification, the separator sheet (10) means separators obtained in the process of producing separators constituting battery cells among battery cells and a battery case constituting a secondary battery, and it should be noted that it is not a polyolefin polymer film obtained from the battery case (including a waste battery case).

Stacked Sheet Supply Step (S20)

Next, in the stacked sheet supply step (S20), a separator sheet (10), a fabric sheet (30) for attaching to the separator sheet, and an adhesive sheet (20) for bonding the separator sheet (10) and the fabric sheet (30) may be supplied.

The adhesive sheet (20) may be supplied to be interposed between the separator sheet (10) and the fabric sheet (30), and may be supplied to form a stacked structure stacked in the order of the separator sheet (10), the adhesive sheet (20) and the fabric sheet (30).

The adhesive sheet (20) may be formed in a web form in order not to block the micropores of the separator sheet (10), which may be, specifically, a hot meth web (20) in a sheet form composed of hot melt fibers (21) in a solid state to have a plurality of pores (22).

The hot melt web (20) may be composed of an ethylene vinyl acetate (EVA) component to have low-temperature melting properties (low-temperature adhesiveness) suitable for the separator sheet (10) composed of a polyolefin-based polymer.

However, it should be noted that the adhesive sheet (20) of this specification does not include an adhesive made of a polyurethane component.

The fabric sheet (30) may have fine hairs of very thin threads formed by a brushing process on one side facing the separator sheet (10). Such fine hairs increase the adhesive surface area between the fabric sheet (30) and the separator sheet (10), whereby it is possible to improve the peel strength of the functional fabric manufactured through a laminating step (S30) to be described below (prevent a phenomenon that the separator sheet is separated from the fabric sheet), as well as it is possible to impart a soft tactual sense or touch sense to functional fabrics.

The type of the fabric sheet (30) may vary in consideration of the field to which the functional fabric is applied.

For example, when the functional fabric is applied as a clothing material, eco-friendly wool, organic cotton, and the like may be used as the fabric sheet (30); when the functional fabric is applied as a material for leisure goods such as tents, polyester or nylon, and the like produced by recycling may be used; and when the functional fabric is applied as a material for industrial products such as special work clothes or protective clothing, conductive thread products, or heat-resistant materials such as aramid may be used.

The speed at which the separator sheet (10), the adhesive sheet (20), and the fabric sheet (30) are supplied is an important means capable of solving the thermal curing problem of the separator together with the temperature atmosphere and pressurization force, to be described below, so that the separator sheet (10), the adhesive sheet (20) and the fabric sheet (30) are all supplied at the same speed, but each sheet must be supplied in a state where a constant tension is maintained.

The separator sheet (10), the adhesive sheet (20), and the fabric sheet (30) may all be supplied at a speed of 6 to 10 m/min. When the supply speed is less than 6 m/min, a heat quantity applied to the separator sheet (10) from the process of melting the adhesive sheet in a laminating step (S30) to be described below increases, whereby it is cured, so that it has a touch sense that cannot be used as a material for functional fabrics, and when the speed is greater than 10 m/min, the adhesion force is lowered, so that there is a problem that the separator sheet is easily peeled off from the fabric sheet.

In this specification, the adhesive sheet (20) means a thin sheet-shaped hot-melt web in which hot-melt fibers are formed in the form of a web to comprise numerous pores, and it should be noted that it is not a method of applying a liquid adhesive (including a hot-melt adhesive) to one side of any one of the separator sheet or the fabric sheet (including application by spraying), and that particularly, it is not a method in which a hot melt type adhesive is applied in a certain ratio between the separator sheet and the fabric sheet to have at least one bonding point per certain section of the laminated surface (dot type application method). Accordingly, when manufacturing the functional fabric according to the present invention, a nozzle for spraying the hot-melt adhesive or constitutions related to spraying pressure of the nozzle are not required.

Laminating Step (S40)

Next, in the laminating step (S30), the separator sheet (10) and the fabric sheet (30) may be bonded through a laminating process.

As described above, in order to realize a suitable peel strength and touch sense as the functional fabric, the stacked structure of the separator sheet (10), the adhesive sheet (20), and the fabric sheet (30) may be dried with hot air in a predetermined temperature atmosphere, and pressurized at a predetermined pressure and laminated.

In the laminating step (S30), the stacked structure may be dried with hot air in a temperature atmosphere composed of 100 to 120° C., and pressurized with a pressure of 2 to 7 kgf/cm² by the compression rollers (R) while passing between the compression rollers (R) maintaining a gap and facing each other.

The present applicant has confirmed that in the functional fabric manufactured through such steps, the problem, in which the separator sheet and the fabric sheet are peeled off due to the low peel strength that may occur in the process of laminating the separator sheet and the fabric sheet by the adhesive sheet, is solved, as well as the problem, in which the separator sheet adopted for cost reduction becomes hard due to thermal curing, is solved.

Hereinafter, the action and effect of the invention will be described in more detail through specific examples of the invention.

TABLE 1

| Classification | Example | Comparative Example |
|---|---|---|
| Resistance to water pressure(mmH₂O) | 4,870 | 4,820 |
| Moisture permeability (g/m²24 h) | 9,312 | 2,457 |
| Air permeability (mm/s) | Less than 1 | Less than 1 |

The resistance to water pressure of <Table 1> above was measured by KS K ISO 811 (hydraulic pressure test, 2015), the moisture permeability was measured by KS K 0594 (test method for water vapor permeability, 2015), and the air permeability was measured by KS K ISO 9237:1995. Referring to <Table 1> above, it could be seen that the functional fabric according to the example had resistance to water pressure of 4,870 mmH₂O, moisture permeability of 9,312 g/m²24 h, and air permeability of less than 1 mm/s, and it could be seen that the fabric according to the comparative example had resistance to water pressure of 4,820 mmH₂O, moisture permeability of 2,457 g/m²24 h, and air permeability of less than 1.

Through <Table 1> above, it could be confirmed that the fabric according to the example had significantly higher moisture permeability, and resistance to water pressure and air permeability corresponding to those of the comparative example, as compared with the fabric according to the comparative example.

<Peel Strength and Touch Sense According to Supply Speed, Temperature, and Pressure>

Example

A separator, which is a polyolefin-based polymer film discarded after overproduction, sheet-type wool, and an adhesive sheet (sheet-type hot melt web) composed of an EVA component are prepared. The separator, adhesive sheet, and wool wound on the supply roll are constantly supplied at a speed of 8 m/min for the laminating process. Here, the supplied separator, adhesive sheet, and wool are maintained to have a constant tension. The laminating is performed by pressurizing the stacked structure of the separator, the adhesive sheet, and the adhesive sheet interposed therebetween at a pressure of 2 kgf/cm² in a hot air-drying atmosphere at 110° C.

At this time, in order to minimize the influence of the load by the pressure applied by the compression rollers, the laminating was performed while securing a gap between the compression rollers facing each other.

Comparative Example

A separator, which is a polyolefin-based polymer film discarded after overproduction, sheet-type wool, and an adhesive sheet (sheet-type hot melt web) composed of an EVA component are prepared. While supplying the separator, adhesive sheet, and fabric sheet, respectively, in a state where the tension was maintained, the speed at which all three sheets were supplied was set to 5, 7, 8, 9, and 11 m/min. The temperature was set at 110~125° C., and the stacked structure of the separator, adhesive sheet, and fabric sheet was pressurized at a pressure of 7 kgf/cm², and laminated to manufacture a fabric, where the peel strength and touch sense of the manufactured fabric were as shown in <Table 2> below.

TABLE 2

| Classification | | Temperature (° C.) | Supply speed (m/min) | Pressure (kgf/cm²) | Peel strength | Touch |
|---|---|---|---|---|---|---|
| Example | | 110 | 8 | 2 | O(Good) | O(Good) |
| Comparative | 1 | 110 | 9 | 7 | O(Good) | Δ(Insufficient) |
| Example | 2 | 110 | 11 | 7 | O(Good) | Δ(Insufficient) |
| | 3 | 115 | 7 | 7 | O(Good) | Δ(Insufficient) |
| | 4 | 120 | 7 | 7 | O(Good) | Δ(Insufficient) |
| | 5 | 125 | 5 | 7 | X(Fail) | X(Fail) |

Through <Table 2> above, it could be confirmed that when the fabric according to the example compared with the fabric according to the comparative example, the separator did not peel off from the fabric sheet, and the separator did not become hard due to thermal curing and has a soft touch sense.

As described above, the preferred examples of the present invention have been described, but the present invention is not limited thereto, and it is possible to implement it with various modifications within the scope of the claims, and the detailed description of invention and the accompanying drawings, which also naturally fall within the scope of the invention.

What is claimed is:

1. A method for manufacturing an upcycle functional fabric, comprising steps of:

(a) preparing a separator sheet with a microporous structure discarded due to treatment as defective or overproduction in production processes for manufacturing secondary batteries, wherein the separator sheet is composed of a polyolefin-based polymer film in the form of a thin film;

(b) interposing an adhesive sheet, which is a hot melt web adhesive made of an ethylene vinyl acetate (EVA) component and formed in the form of a web provided with a plurality of pores, between the separator sheet and a fabric sheet to be added to the separator sheet, thereby supplying each sheet;

(c) laminating the separator sheet and the fabric sheet so that they are bonded by melting of the adhesive sheet, wherein in the step (b), each sheet is supplied to maintain a constant tension, but the separator sheet, the adhesive sheet, and the fabric sheet are all supplied at the same speed of 6 to 10 m/min, and in the step (c), a stacked structure, in which the separator sheet, the adhesive sheet, and the fabric sheet are stacked in this order is pressed in a temperature of 100 to 120° C., and laminated, wherein in the step (c), the stacked structure passes between compression rollers maintaining a gap and facing each other, and simultaneously is pressed at a pressure of 2 to 7 kgf/cm2 by the compression rollers, wherein the fabric sheet has fine hairs of microfiber formed by a brushing process on one side facing the separator sheet in order to increase an adhesive surface area with the separator sheet.

\* \* \* \* \*